United States Patent Office 2,861,990
Patented Nov. 25, 1958

2,861,990

ORGANIC COMPOUNDS

Charles Spencer Cleaver and David Charles England, Wilmington, Del., assignors to E. I. du Pont de Nemours and Company, Wilmington, Del., a corporation of Delaware No Drawing. Application December 9, 1955
Serial No. 552,225

13 Claims. (Cl. 260—243)

This invention relates to a new class of organic compounds containing nitrogen and fluorine. More particularly, it relates to fluorine-containing heterocyclic amines and to a process of preparing them.

It is known that N-fluoroethylamines can be prepared by reacting strongly basic amines, e. g., secondary alkylamines with tetrafluoroethylene or with trifluorochloroethylene. It is also known (British Patent 583,874; see also U. S. Patent 2,409,315) that these N-fluoroethylamines are extremely sensitive to water, which hydrolyzes them very readily to fluoroacetamides, e. g., N,N-dialkyl-α,α-difluoroacetamides.

It is an object of this invention to provide a new class of N-fluoroalkylamines which are resistant to water. A further object is to provide a process for preparing them. Other objects of the invention will become apparent from the specification and claims.

It has now been found that unexpectedly water-resistant N-fluoroalkylamines can be prepared under suitable conditions from fluoroalkenes and heterocyclic non-basic amines. The new products of this invention are N-fluoroalkyl heterocyclic tertiary monoamines in which the amino nitrogen is a ring member attached by single valences to two ring carbon atoms which are each attached to a different ring carbon atom by a double bond, and the N-fluoroalkyl group is a halogen-substituted group of at least 2 carbons in which the alpha-carbon is attached to two fluorine atoms and the beta-carbon is attached to at least one hydrogen and at least one halogen atom of atomic number 9 to 17, any other substituents in the N-alkyl group being halogens of atomic number 9 to 17. Hence the products of this invention are characterized by the following arrangement of atoms:

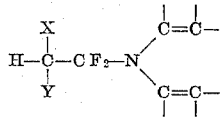

wherein X represents fluorine or chlorine and Y represents hydrogen, fluorine, chlorine, an alkyl group or a haloalkyl group in which the halogens are fluorine or chlorine.

These heterocyclic amines are prepared by reacting a halogen-substituted 1,1-difluoro-1-alkene, having at least one halogen substituent in the 2-position and any substituents being fluorine or chlorine, i. e., a fluoroalkene of the formula

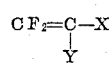

wherein X and Y are as defined above, with a heterocyclic secondary monoamine in which the amino nitrogen is a ring member attached to hydrogen and attached by single valences to two ring carbon atoms which are each attached to a different ring carbon atom by a double bond, in the presence of catalytic amounts of the alkali metal compound formed by replacing the amino hydrogen of said heterocyclic amine by an alkali metal. This is a general reaction of any heterocyclic secondary monoamine in which there is a heterocyclic nucleus containing the above arrangement of secondary amino nitrogen and ring carbons with a fluoroolefin of the defined class to produce compounds having in common the characteristic molecular structure,

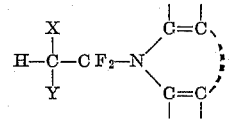

where X and Y have the significance stated above. The dotted line between the carbon atoms furthest from the nitrogen represents the atom or atoms, e. g., —O—, —S—, or —CH$_2$—, which complete the heterocyclic ring when the latter has more than five members. The remaining portions of the molecule, that is, the substitutents, if any, attached to the annular atoms, and the remaining ring members, if any, are largely immaterial and do not substantially affect the properties of the compounds as a whole, such as their resistance to the action of water.

The more accessible, and therefore preferred, products of this invention are those represented by the formulas

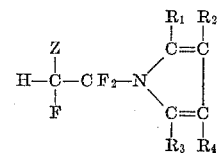

and

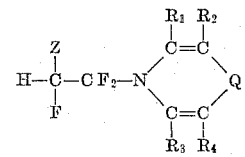

where Z is fluorine, chlorine or trifluoromethyl; the R's are hydrogen or the group —CH=CH—, in which latter case two R's attached to adjacent annular carbons linked by a double bond form together an o-phenylene group, i. e., a benzo substituent; and Q is methylene, oxygen or sulfur.

The N-fluoroalkyl cyclic tertiary amines of this invention have the valuable property of being resistant towards cold or hot water. This property was completely unexpected since, as already mentioned, the N-fluoroethyl derivatives of aliphatic secondary amines are highly water-sensitive and form N,N-dialkyl-α,α-difluoroacetamides on mere contact with cold water. The amines of this invention can in some cases be hydrolyzed to fluoroacetamides but this requires a much more drastic treatment than mere action of water, in that prolonged contact with hot aqueous acids or alkalies is necessary to produce hydrolysis.

The principal fluoroalkenes which serve as starting materials in the process of this invention are tetrafluoroethylene, $CF_2=CF_2$; trifluorochloroethylene, $CF_2=CFCl$; perfluoropropene, $CF_2=CF—CF_3$; 1,1 - difluoro - 2,2 - dichloroethylene, $CF_2=CCl_2$; 1,1-difluoro-2-chloroethylene, $CF_2=CHCl$; trifluoroethylene, $CF_2=CHF$; and the alkyltrifluoroethylenes of application Serial No. 374,450, filed by Stanley Dixon on August 14, 1953. The first three listed fluoroethylenes are the most useful.

The other reactants are the heterocyclic secondary amines already defined. It will be noted that amines of this type are not basic. In fact, they have a weakly acidic nature. The suitable heterocyclic amines can be readily identified by the fact that they are capable of reacting with potassium metal with evolution of hydrogen to give a potassium derivative, or "salt," in which the metal is attached to the amino nitrogen.

In contrast to basic amines, which react with the fluoroethylenes readily without the help of a catalyst, these "acidic" amines are, as such, unreactive with the fluoroethylenes. The reaction proceeds only in the presence of a catalytic amount of an alkali metal "salt" of a nonbasic heterocyclic amine of the type defined above. This catalyst can be prepared in advance and added as such to the reaction mixture, if desired, but in practice it is more convenient to add a small amount (e. g., from 0.01 to 0.4, preferably from 0.03 to 0.35 gram atom per mole of heterocyclic amine) of an alkali metal, preferably potassium or sodium, to the heterocyclic amine employed. After the alkali metal has reacted with the amine, as shown by the cessation of hydrogen evolution, the fluoroalkene is reacted, preferably, when it is gaseous, under slightly elevated pressure, e. g., 5–50 lb./sq. in., in a sealed vessel, with the mixture of amine and catalyst, if desired with agitation. The reaction is generally exothermic and no external heating is necessary. On the contrary, cooling may be indicated. However, elevated temperatures, for example up to 150° C., may be used in case the reaction is sluggish.

A solvent or diluent is not necessary but, if desired, an anhydrous diluent having a neutral reaction can be added to facilitate contact. Examples of such diluents are aromatic hydrocarbons such as toluene or the xylenes; ethers such as di-n-butyl ether, dimethoxyethane, dioxane; thioethers such as dimethyl sulfide; ketones such as acetone; or amides such as dimethylformamide or dimethylacetamide. While the diluent should be inert to the reaction mixture, the diluent need not necessarily be inert towards alkali metals since it can be added after the alkali metal has reacted with the heterocyclic amine.

The reaction is preferably continued until the fluoroalkene is no longer appreciably absorbed, although of course the reaction can be interrupted before this point if desired. The reaction mixture is then acidified to liberate that portion of the N-fluoroalkylamine which is combined with the alkali metal, and the reaction product is isolated by any suitable means such as solvent extraction followed by distillation or crystallization.

The following examples illustrate specific embodiments of the invention:

*Example I*

A mixture of 100 g. of pyrrole and 3.5 g. of potassium cut in small pieces was shaken for several hours under nitrogen until all the potassium had combined, the hydrogen which evolved being vented at intervals. The resulting suspension of potassium "salt" of pyrrole in pyrrole was pressured with tetrafluoroethylene at a pressure of 40 lb./sq. in. and the reaction mixture was shaken mechanically. Upon warming to 100° C., there was rapid and exothermic absorption of tetrafluoroethylene. When this had essentially subsided, the reaction mixture was cooled and poured into cold, dilute aqueous sulfuric acid. The organic layer was separated and distilled, giving 185 g. (74% yield) of N-(1,1,2,2-tetrafluoroethyl)pyrrole,

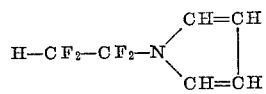

boiling at 102° C. at 760 mm. pressure.

*Analysis.*—Calc'd for $C_6H_5NF_4$: C, 43.1; H, 3.0; F, 45.5. Found: C, 43.9; H, 3.3; F, 44.9.

The structure of this product was confirmed by its nuclear magnetic resonance spectrum. Its remarkable resistance to hydrolysis was established by the fact that it was recovered unchanged after being refluxed in 20% aqueous potassium hydroxide.

*Example II*

Using essentially the procedure of Example I, 66.8 g. of carbazole was reacted with 3.9 g. of potassium. After adding 100 ml. of dimethylformamide, the mixture was reacted with tetrafluoroethylene as in Example I, then acidified. The organic material was extracted with ether. On distillation, there was obtained a liquid, boiling at about 133° C. at 2 mm. pressure, which solidified. Recrystallization from petroleum ether gave 66.5 g. (62% yield) of N-(1,1,2,2-tetrafluoroethyl)carbazole,

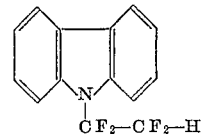

M. P. 48–49° C. The structure of this product was established by its nuclear magnetic resonance spectrum and by its elemental analysis.

*Analysis.*—Calc'd for $C_{14}H_9NF_4$: C, 63.0; H, 3.4; F, 28.4. Found: C, 63.7; H, 3.5; F, 29.1.

*Example III*

A solution of 60. g. of phenothiazine in 75 ml. of dimethylformamide did not react with tetrafluoroethylene under 40 lb./sq. in. pressure even when heated to 80° C. When this solution was cooled, treated dropwise with stirring with 4.6 g. of a 50% suspension of sodium in xylene (2.3 g. sodium), then repressured with tetrafluoroethylene, an exothermic reaction started. The temperature of the mixture was kept at about 80° C. by pressuring the tetrafluoroethylene in slowly until 28 g. of it was absorbed. The reaction mixture was poured into cold dilute sulfuric acid, the heavy organic layer was separated, the aqueous layer was extracted with ether and the ether extract combined with the organic layer. After washing this solution with dilute sodium bicarbonate and drying it, it was distilled, giving 62.4 g. (69.4% yield) of N-(1,1,2,2-tetrafluoroethyl)phenothiazine,

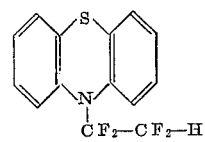

B. P. 144–150° C. at 3 mm. pressure. This product solidified and it was recrystallized from cyclohexane, using active charcoal to remove any color present. The purified material was obtained as white crystals melting at 58–59° C.

*Analysis.*—Calc'd for $C_{14}H_9F_4NS$: F, 25.4; S, 10.7. Found: F, 25.5; S, 10.7.

*Example IV*

Pyrrole (85 g.) was shaken for several hours with 3.5 g. of potassium cut in small pieces. This mixture was pressured with chlorotrifluoroethylene at about 40 lb./sq. in. and shaken. The reaction was exothermic and the mixture had to be cooled externally to keep the temperature below 80° C. When the absorption was completed, the reaction mixture was worked up as in Example III. There was obtained 160 g. (69% yield) of N-(1,1,2-trifluoro-2-chloroethyl)pyrrole,

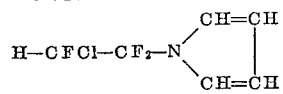

B. P. 75° C. at 100 mm. pressure, $n_D^{25}$ 1.4291. The structure of this material was confirmed by its nuclear magnetic resonance spectrum.

*Analysis.*—Calc'd for $C_6H_5NF_3Cl$: Cl, 19.3; F, 31.1; N, 7.6. Found: Cl, 19.4; F, 31.1; N, 7.2.

Example V

A mixture of 35 g. of indole and 2 g. of potassium was warmed on a steam bath until all the potassium was reacted, then pressured with chlorotrifluoroethylene at 40 lb./sq. in. and shaken until 18.5 g. of chlorotrifluoroethylene had been absorbed. To the mixture was then added 50 ml. of dimethylformamide, and it was repressured with chlorotrifluoroethylene, of which an additional 12.6 g. was absorbed. The reaction mixture was worked up as in the preceding examples. There was obtained on distillation 61.8 g. (88% yield) of N-(1,1,2-trifluoro-2-chloroethyl)indole,

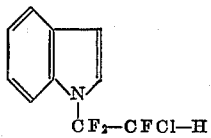

B. P. 78–79° C. at 3 mm. pressure, $n_D^{25}$ 1.5281, whose structure was confirmed by nuclear magnetic resonance spectrum data.

*Analysis.*—Calc'd for $C_{10}H_7NF_3Cl$: N, 6.0; Cl, 15.2; F, 24.4. Found: N, 6.3; Cl, 15.2; F, 24.3.

Example VI

The preceding example was repeated except that tetrafluoroethylene was used instead of chlorotrifluoroethylene, and 50 ml. of dimethylformamide was added to the mixture before pressuring with tetrafluoroethylene. There was obtained on distillation 48.4 g. (74.5% yield) of N-(1,1,2,2-tetrafluoroethyl)indole, B. P. 83° C. at 10 mm., $n_D^{25}$ 1.4961.

*Analysis.*—Calc'd for $C_{10}H_7NF_4$: N, 6.4; 35.0. Found: N, 6.5; F, 33.9.

Example VII

A mixture of 53 g. of pyrrole and 5 g. of potassium was shaken until all the potassium had reacted. The mixture was then diluted with 50 ml. of dimethylformamide and shaken in an atmosphere of perfluoropropene at 40 lb./sq. in. pressure. The perfluoropropene was absorbed exothermically and the reaction mixture was cooled with ice to permit more rapid absorption. When the gas was no longer absorbed, the mixture, which had increased in weight by 138 g., was poured into dilute sulfuric acid and worked up as in Example III. There was obtained 105 g. (61% yield) of N-(1,1,2,3,3,3-hexafluoropropyl)-pyrrole,

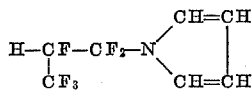

B. P. 55° C. at 100 mm., $n_D^{25}$ 1.3820. The structure of this material was confirmed by its nuclear magnetic resonance spectrum.

*Analysis.*—Calc'd for $C_7H_5NF_6$: N, 6.4; F, 52.6. Found: N, 6.7; F, 51.0.

Example VIII

A solution of 1.8 g. of potassium in 13.4 g. of pyrrole was treated with 25 ml. of dimethylformamide and 13.8 g. of n-butyltrifluoroethylene ($C_4H_9$—CF=$CF_2$, prepared by reacting n-butyl lithium with tetrafluoroethylene as described in application Ser. No. 374,450, already referred to). The reaction mixture was heated in a pressure vessel at 100° C. for 4 hours, and the product was isolated as in the preceding examples. There was obtained on distillation 12 g. of N-(1,1,2-trifluoro-n-hexyl)pyrrole,

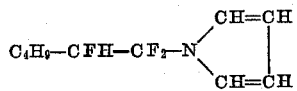

B. P. 90° C. at 20 mm. pressure, $n_D^{25}$ 1.4372.

*Analysis.*—Calc'd for $C_{10}H_{14}F_3N$: F, 27.8; N, 6.8. Found: 25.0; N, 6.7.

Example IX

A solution of 2.2 g. of potassium in 26.8 g. of pyrrole was pressured with trifluoroethylene at room temperature. There was little absorption of the gas at first but, on adding 25 ml. of dimethylformamide and repressuring with trifluoroethylene at 40 lb./sq. in., a rapid and exothermic reaction took place, during which 20 g. of trifluoroethylene was absorbed. The reaction mixture was treated as in the preceding examples. There was isolated on distillation 24 g. of N-(1,1,2-trifluoroethyl)pyrrole,

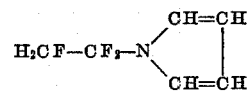

B. P. 121–125° C. However, this material was not completely pure, as indicated by its nitrogen content of 11.1% (calculated, 9.4%). Its nuclear magnetic resonance spectrum showed the presence of some pyrrole which had codistilled with it and was difficult to separate.

While the process of this invention has been illustrated with reference to certain specific reactants in the foregoing examples, it is broadly applicable to the reaction of fluoroalkenes of the formula

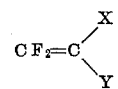

where X is fluorine or chlorine and Y is hydrogen, fluorine, chlorine, an alkyl radical or a haloalkyl radical where the halogens have atomic number from 9 to 17, inclusive, said radicals preferably having from 1 to 12 carbon atoms, with secondary heterocyclic monoamines of the type defined prior to the examples. Thus, the procedure of the above examples may be applied to other fluoroalkenes of the type described such as 1,1-difluoro-2,2-dichloroethylene; 1,1-difluoro-2-chloroethylene; perfluoroheptene-1, $CF_2$=CF—$(CF_2)_4$—$CF_3$; 8-hydroperfluorooctene-1, $CF_2$=CF—$(CF_2)_6H$; 12-hydroperfluorododecene-1, $CF_2$=CF—$(CF_2)_{10}H$; methyltrifluoroethylene, $CF_2$=CF—$CH_3$; ethyl trifluoroethylene $$CF_2=CF—C_2H_5$$

n-dodecyltrifluoroethylene, $CF_2$=CF—$C_{12}H_{25}$; 1,1,2-trifluoro-2-chloromethyl ethylene, $CF_2$=CF—$CH_2Cl$; 1,1,2-trifluoro-2-(2-chloroethyl) ethylene $$CF_2=CF—CH_2—CH_2Cl$$

etc., and to other secondary heterocyclic amines, including, for example, 2-methylpyrrole, 2,5-diethylpyrrole, 2-methylindole, 1,4-dihydroquinoline, 9,10-dihydroacridine, phenoxazine, 3-methyl-1,4-benzoxazine, 1,4-benzothiazine, and the like.

By far the most useful of the operable amines are those having one of the following nuclei:

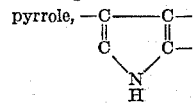

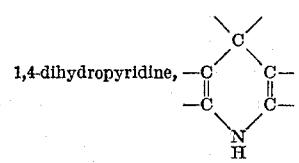

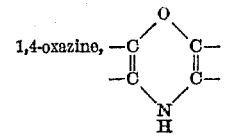

1,4-thiazine, 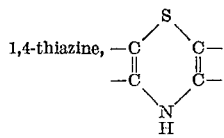

The preferred amine reactants are pyrrole and the monobenzo and dibenzo derivatives of pyrrole, 1,4-dihydropyridine, 1,4-oxazine and 1,4-thiazine, e. g., benzopyrrole (indole), dibenzopyrrole (carbazole), dibenzo-1,4-dihydropyridine (9,10-dihydroacridine), dibenzo-1,4-oxazine (phenoxazine), dibenzo-1,4-thiazine (phenothiazine), and the like.

Additional specific examples of N-fluoroethyl tertiary amines which can be prepared from reactants of the type discussed above include N-(1,1,2,2-tetrafluoroethyl)-2-methylpyrrole, N-(1,1-difluoro-2,2-dichloroethyl)pyrrole, N-(1,1,2,2-tetrafluoroethyl)-2-methylindole, N-(1,1-difluoro-2-chloroethyl)indole, N-1,1,2-trifluoro-2-chloroethyl)carbazole, N-(1,1,2,2-tetrafluoroethyl)-1,4-dihydroquinoline, N-(1,1,2,2-tetrafluoroethyl)-9,10-dihydroacridine, N-(1,1,2-trifluoro-2-chloroethyl)phenoxazine, N-(1,1,2,2-tetrafluoroethyl)-phenoxazine, N-(1,1,2-trifluoro-2-chloroethyl)phenothiazine, N-(1,1,2,2-tetrafluoroethyl)-1,4-benzoxazine, N-(1,1,2,2-tetrafluoroethyl)-3-methyl-1,4-benzoxazine, N-(1,1,2,2-tetrafluoroethyl)-1,4-benzothiazine, N-(1,1,2,3,3,3-hexafluoropropyl)carbazole, N-(1,1,2,3,3,3-hexafluoropropyl) phenothiazine N-(1,1,2-trifluoro-n-tetradecyl) pyrrole, N-(2-hydroperfluoroheptyl) carbazole, N-(2,8-dihydroperfluorooctyl)pyrrole, N-(1,1,2-trifluoropropyl)phenothiazine, etc.

The N-fluoroalkyl heterocyclic tertiary monoamines of this invention are, in general, useful for the same purposes for which the most nearly corresponding unhalogenated tertiary amines are useful, and have the valuable property of high resistance to hydrolysis. Hence they are useful as detergents and wetting agents, and as corrosion inhibitors for steel. They are useful as additives for gasoline and oil to reduce gum and color formation, and to help remove fuel line and piston deposits. Certain of the compounds have biological uses. The N-(1,1,2,2-tetrafluoroethyl)carbazole of Example II has substantial herbicidal activity as shown by its effects on test plants, and is also active as a protozoicide. The N-(1,1,2,2-tetrafluoroethyl)pyrrole of Example I shows substantial activity against soil nematodes.

Since many different embodiments of the invention may be made without departing from the spirit and scope thereof, it is to be understood that the invention is not limited by the specific illustrations except to the extent defined in the following claims.

What is claimed is:
1. An N-fluoroalkyl heterocyclic tertiary monoamine of the formula

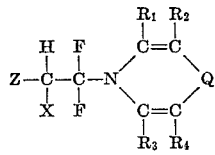

wherein (1) Q is a member of the group consisting of a single bond, oxygen, sulfur, and methylene; (2) $R_1$ and $R_2$ are selected from the group consisting of hydrogen, halogen, lower alkyl, and, taken together, the radical —CH=CH—CH=CH— where the terminal carbons form with the two doubly-bonded nuclear carbons an aromatic ring; (3) $R_3$ and $R_4$ are selected from the group consisting of hydrogen, halogen, lower alkyl, and, taken together, the radical —CH=CH—CH=CH— where the terminal carbons form with the two doubly-bonded nuclear carbons an aromatic ring (4) Z is a member of the group consisting of fluorine, chlorine, alkyl and haloalkyl; and (5) X is a member of the group consisting of chlorine and fluorine.

2. An N-fluoroalkyl heterocyclic tertiary amine of the formula

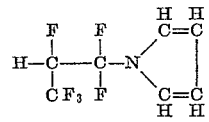

3. N-(1,1,2,2-tetrafluoroethyl)phenothiazine.
4. N-(1,1,2,2-tetrafluoroethyl)carbazole.
5. The process for preparing an N-fluoroalkyl heterocyclic tertiary monoamine of claim 1 which comprises reacting a fluoroalkene of the formula

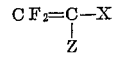

with a heterocyclic secondary monoamine of the formula

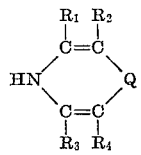

X, Z, Q, $R_1$, $R_2$, $R_3$, $R_4$ being as defined in claim 1, in the presence of an alkali metal compound formed by replacing the amine hydrogen of said secondary monoamine with an alkali metal.

6. The process of claim 5 wherein said fluoroalkene is selected from the group consisting of tetrafluoroethylene, trifluorochloroethylene and perfluoropropene.

7. The process of claim 5 wherein said alkali metal compound is formed in situ by adding 0.01 to 0.4 gram atom of alkali metal per mole of said heterocyclic amine to the reaction mixture.

8. The process of claim 5 wherein said secondary monoamine is pyrrole.

9. The process of claim 5 wherein said secondary monoamine is indole.

10. The process of claim 5 wherein said secondary monoamine is carbazole.

11. The process of claim 5 wherein said secondary monoamine is phenothiazine.

12. N-(1,1,2,2-tetrafluoroethyl)pyrrole.
13. N-(1,1,2-trifluoro-2-chloroethyl)pyrrole.

References Cited in the file of this patent

UNITED STATES PATENTS

| 2,409,315 | Rigby et al. | Oct. 15, 1946 |
| 2,558,875 | Pearson | July 3, 1951 |
| 2,613,221 | Ladd | Oct. 7, 1952 |

FOREIGN PATENTS

| 583,874 | Great Britain | Jan. 1, 1947 |

OTHER REFERENCES

Pruett et al.: "J. Am. Chem. Soc.," vol. 72, August 1950, pages 3646 to 3650.